Figure 1:
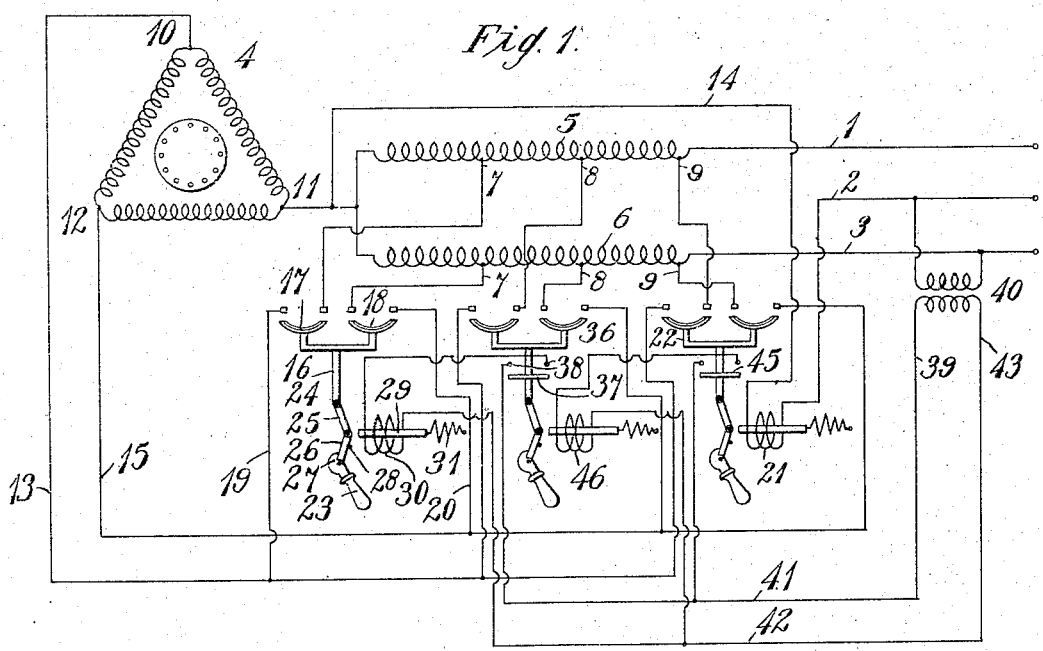

T. VARNEY & C. G. TARKINGTON.
MOTOR STARTING CONTROLLER.
APPLICATION FILED MAY 9, 1911.

1,046,688.  Patented Dec. 10, 1912.

WITNESSES:

INVENTORS
Theodore Varney
Clarence G. Tarkington
BY
Wesley G. Carr
ATTORNEY

UNITED STATES PATENT OFFICE.

THEODORE VARNEY, OF PITTSBURGH, PENNSYLVANIA, AND CLARENCE G. TARKINGTON, OF CHICAGO, ILLINOIS, ASSIGNORS TO WESTINGHOUSE ELECTRIC AND MANUFACTURING COMPANY, A CORPORATION OF PENNSYLVANIA.

MOTOR-STARTING CONTROLLER.

1,046,688.  Specification of Letters Patent.  Patented Dec. 10, 1912.

Application filed May 9, 1911. Serial No. 626,056.

*To all whom it may concern:*

Be it known that we, THEODORE VARNEY and CLARENCE G. TARKINGTON, citizens of the United States, and residents, respectively, of Pittsburgh, in the county of Allegheny and State of Pennsylvania, and of Chicago, in the county of Cook and State of Illinois, have invented a new and useful Improvement in Motor-Starting Controllers, of which the following is a specification.

Our invention relates to starting controllers for electric motors and it has special reference to such controllers as are adapted to control motors of very large capacity.

The object of our invention is to provide a system of the above-indicated character that shall embody a series of manually closed circuit interrupters provided with mechanically interlocking means to necessitate their closure in a predetermined sequence and with such electrically interlocking means that each circuit breaker shall automatically open the preceding circuit breaker of the series.

For starting electric motors of very large size, a series of manually operated switches are sometimes employed on account of the very large currents which are necessarily handled, and such switches are usually mechanically interlocking in such manner that they can only be closed in the proper sequence, but, as ordinarily arranged, they remain closed during the normal operation of the motor.

When resistance is employed for securing the necessary voltage control, the above specified arrangement has no serious disadvantages, but, when the switches are connected to different voltage taps of auto transformers, or other similar regulating means, local short circuited currents are established if two or more of the control switches remain closed at the same time. It is therefore desirable to open each switch as soon as the next succeeding switch is closed.

According to our present invention, we employ a series of circuit breakers of any well known type which are closed manually and are tripped by an electro-magnet. We mechanically interlock the breakers in such manner that they are necessarily closed in the proper order, and, as each breaker in the series is closed, the circuit of the trip coil for the preceding breaker is also closed. While, as above indicated, the system is especially adapted for starting alternating current motors, it may be found advantageous for starting large direct current motors when it is desired to quickly reinsert the starting resistance in case of an overload on the circuit.

Figure 2:
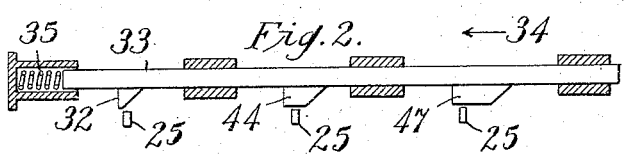

Figure 1 of the accompanying drawings is a diagrammatic view of a starting controller of our invention applied to a polyphase alternating current motor. Fig. 2 is a detail view illustrating a simple means of mechanically interlocking the circuit breakers of Fig. 1, and Fig. 3 is a view corresponding to Fig. 1 that shows the application of our motor starter to a direct current motor.

Referring to Fig. 1 of the drawings, alternating current energy is supplied from any suitable source (not shown) through conductors 1, 2 and 3 to an induction motor 4, transformer windings 5 and 6 being utilized for reducing the voltage applied to the motor at starting. The transformer winding 5 is connected across the circuit conductors 1 and 2, and the transformer winding 6 is connected across conductors 2 and 3, each of the windings being provided with taps 7, 8 and 9. The motor terminals 10, 11 and 12 are respectively connected, during the normal operation of the motor, to line conductors 1, 2 and 3 through conductors 13, 14 and 15. In starting the motor, a circuit breaker 16 is first closed, energy then being supplied to the motor from the taps 7 of the transformer windings 5 and 6, through contact members 17 and 18 of the circuit breaker, conductors 19 and 20 and conductors 13 and 15 to the motor terminals 10 and 12, the terminal 11 being connected directly to the line conductor 2 through a trip coil 21 of a circuit breaker 22. The motor is thus started by an application of relatively low-voltage current to its windings. The circuit breaker 16 comprises a closing handle 23, a contact-bearing member 24, and interposed links 25 and 26. The handle 23 is provided with a projection 27 which is brought into engagement with the link 26 in closing the breaker. A stop 28 prevents the links from collapsing after the breaker has been moved into its closed position, and a core member 29 is adapted to trip the breaker when actuated by a trip coil 30 in opposition to a spring 31.

As shown in Fig. 2 of the drawings, the link 25 of the breaker moves into engagement with a pawl 32 of an interlocking rod 33, the arrangement of parts being such that the rod is moved longitudinally in the direction of the arrow 34 and in opposition to spring 35 when the breaker is closed. When it is desired to further accelerate the motor, circuit breaker 36 is closed, energy then being supplied to the motor terminals 10 and 12 from the transformer taps 8. The circuit breaker 36 is provided with an auxiliary contact member 37 which bridges contact members 38 and completes a circuit, when breaker 36 is closed from a terminal 39 of a transformer 40, which may be replaced by any suitable auxiliary source of current, through conductor 41, contact members 37 and 38, trip coil 30 of circuit breaker 16 and conductor 42 to the opposite terminal 43 of the transformer. It is, therefore, evident that the breaker 16 is opened immediately upon the closing of the circuit breaker 36 and, consequently, the transformer sections between the taps 7 and 8 are only short circuited for a very short time. The circuit breaker 36 is similar to the circuit breaker 16 and, as shown in Fig. 2, the rod 33 is provided with a pawl 44 which is so formed and so placed that the breaker 36 can only be closed after the breaker 16 has been closed. The circuit breaker 22 connects the motor terminals 10 and 12 directly to the line conductors 1 and 3, and is provided with an auxiliary contact member 45 which completes a circuit through trip coil 46 of the circuit breaker 36. The rod 33 is further provided with a pawl 47 which prevents the circuit breaker 22 from being closed until the circuit breaker 36 has been closed. Briefly, the action of the control switches is to gradually apply increased voltages to the motor terminals by a series of steps, the circuit connections for each step being interrupted as soon as the next succeeding step is completed. The trip coil 21 of the circuit breaker 22 is, as above indicated, connected in series relation to line conductor 2 so that, if the current traversing the motor circuit exceeds a predetermined amount, the circuit breaker will be opened and the motor circuits entirely interrupted. In order to reaccelerate the motor, it will be necessary to again close the circuit breakers 16, 36 and 22 in the order named, as before.

Figure 3:
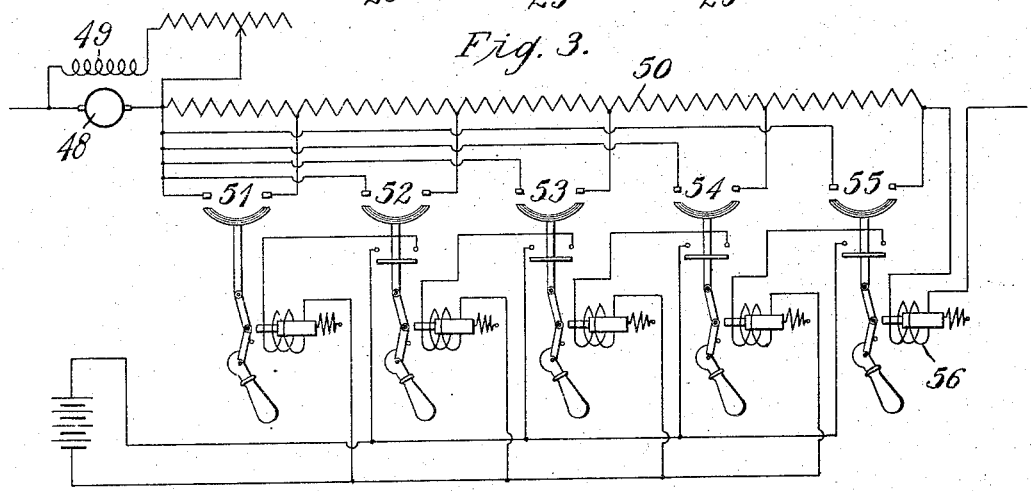

Referring to Fig. 3 of the drawings, a direct current motor having an armature 48, a field magnet winding 49 and a starting resistance 50 is governed by a series of circuit breakers 51 to 55, inclusive, which are similar to the circuit breakers shown in Fig. 1 and are preferably interlocked in the same manner. The action of the circuit breakers is to gradually short circuit the resistance 50, each breaker serving to open the preceding breaker. Circuit breaker 55, which is the last to be closed, is provided with a trip coil 56 that is connected in series relation to the motor circuit and serves to reinsert the starting resistance in case the current traversing the motor circuit exceeds a predetermined amount.

Our motor controller may be applied to the control of various electric machines, and we desire that only such limitations shall be imposed as are indicated in the appended claims.

We claim as our invention:

1. In a motor starter, the combination with a plurality of manually closed switches and tripping coils therefor, of means for restricting the closure of said switches to a predetermined sequence, and means dependent upon the closure of each of the switches, except the first, for energizing the tripping coil of the preceding switch.

2. In a motor starter, the combination with a plurality of main switches and tripping coils therefor, of means for restricting the closure of said switches to a predetermined sequence, and an auxiliary switch operated by each main switch, except the first, to close the circuit of the tripping coil of the preceding switch.

3. In a motor starter, the combination with a plurality of main switches and tripping coils therefor, of means for restricting the closure of said switches to a predetermined sequence, an auxiliary switch operated by each main switch, except the first, to close the circuit of the tripping coil of the preceding switch, the tripping coil of the last switch being dependent upon predetermined conditions in the motor circuit.

4. The combination with an electric motor, a supply circuit therefor, and a series of motor-starting switches adapted to be manually closed in a predetermined sequence, of means for opening each switch upon the closure of the next succeeding switch, and means dependent upon predetermined conditions in the motor circuit for opening the last switch of the series.

5. The combination with an electric motor, a supply circuit therefor, and a series of motor-starting switches adapted to be manually closed in a predetermined sequence, of means for opening each switch upon the closure of the next succeeding switch, and means dependent upon the current traversing the motor circuit for opening the last switch of the series.

6. The combination with an electric motor, a supply circuit therefor, a series of control switches for the motor that are mechanically interlocked to preclude the closure of the switches except in a predetermined sequence, of a trip coil for each switch, and auxiliary switches operatively connected to each of the switches except the first, the trip coils of each switch, except the last, being energized when the auxiliary switch of the next succeeding switch of the series is closed and the trip coil of the last switch of the series being energized to open the switch only when the current traversing the motor circuit exceeds a predetermined amount.

In testimony whereof, I have hereunto subscribed my name this 25th day of April, 1911.

THEODORE VARNEY.

Witnesses:
B. B. HINES,
M. C. MERZ.

In testimony whereof, I have hereunto subscribed my name this 18th day of April, 1911.

CLARENCE G. TARKINGTON.

Witnesses:
CLARENCE T. WEIR,
D. B. HUTCHINSON.

---

Copies of this patent may be obtained for five cents each, by addressing the "Commissioner of Patents, Washington, D. C."